Figure 1:
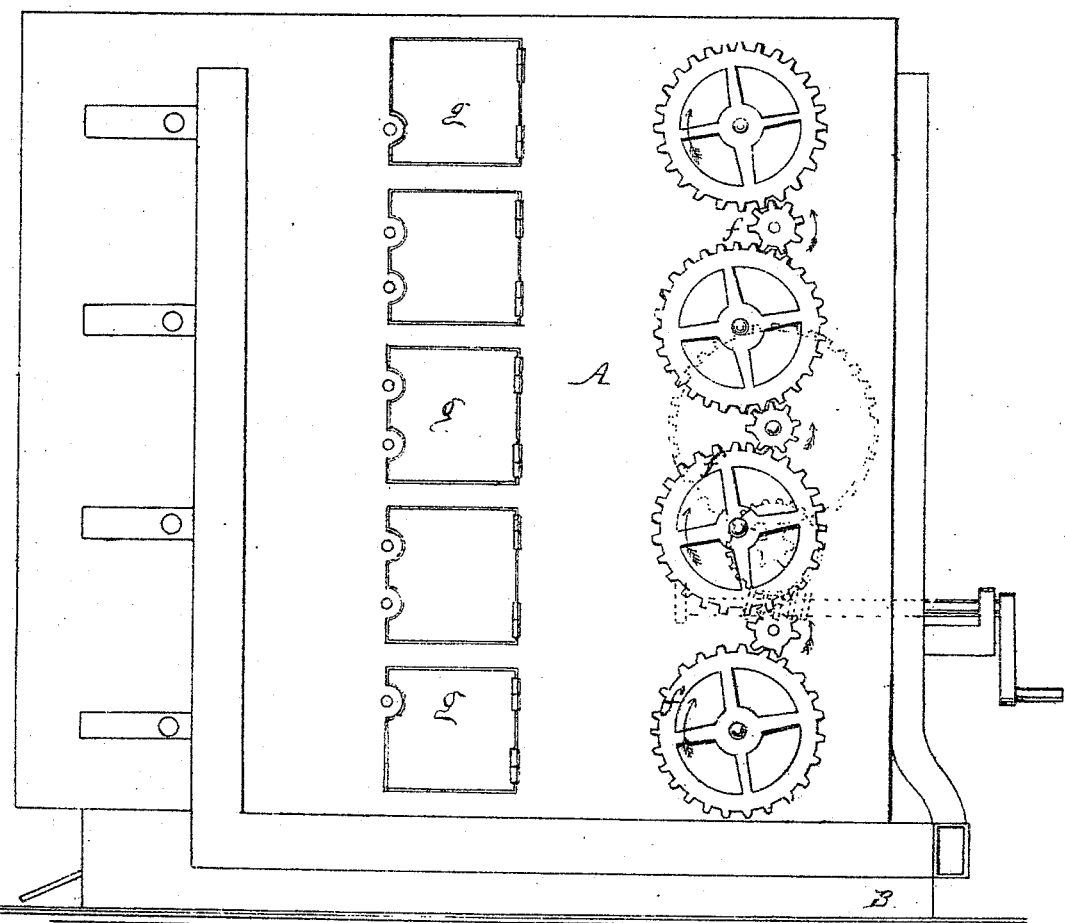

Sheet 1 – 3 Sheet.

J. De Bary
Grain-Drier.

Nº 75386     Patented Mar. 10, 1868.

Witnesses
Theo Insche
W. Trewin

Inventor
J. de Bary
Per Munn &
Attorneys

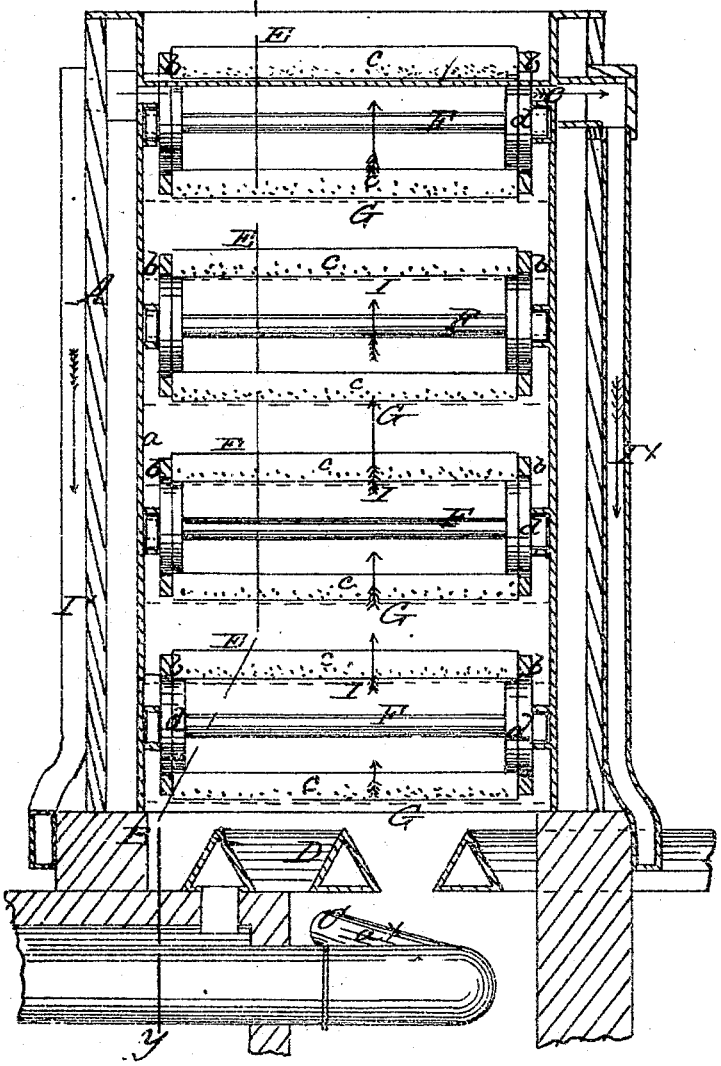

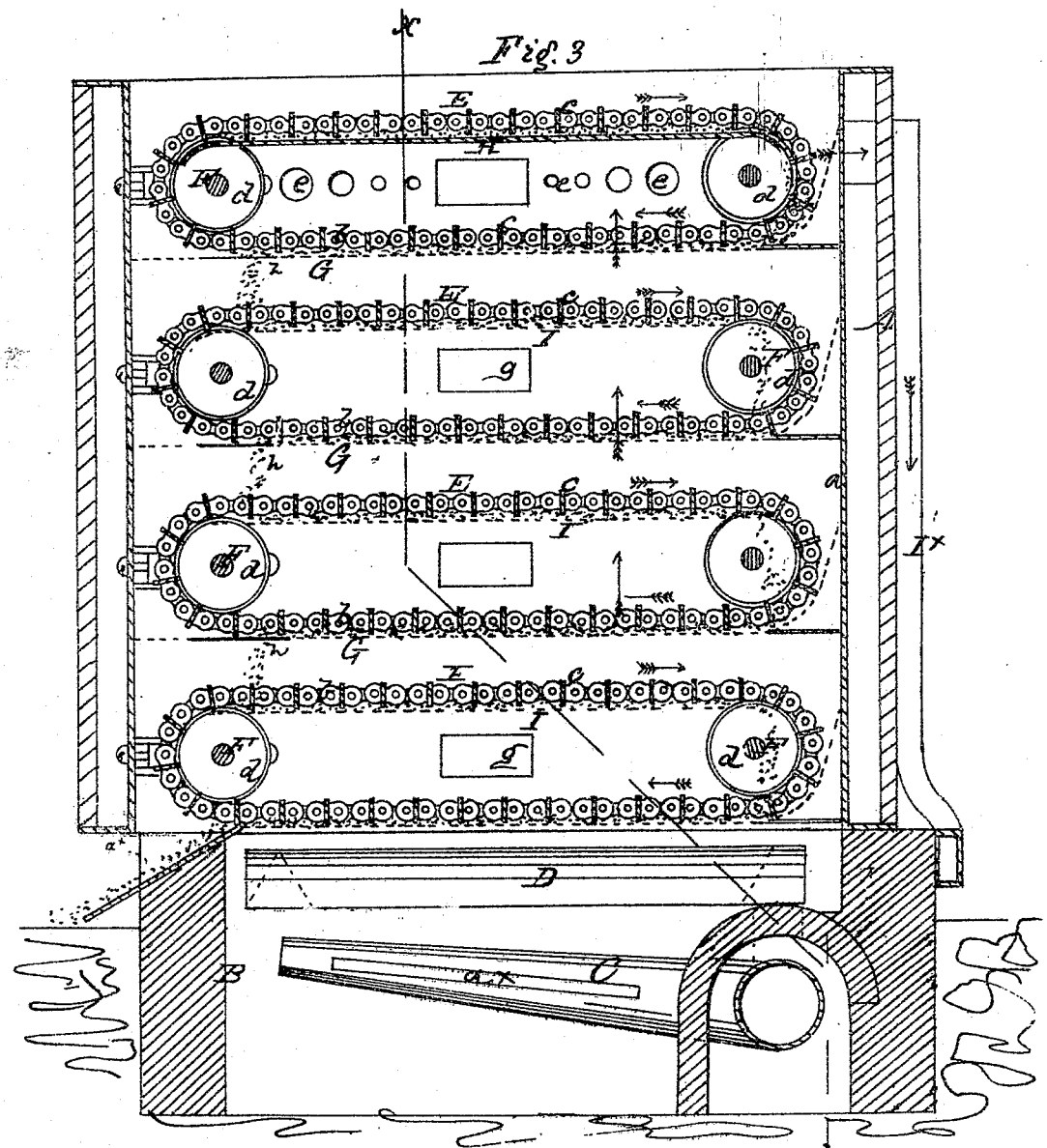

United States Patent Office.

JULIUS DE BARY, OF OFFENBACH, GERMANY, ASSIGNOR TO WILLIAM EINSTEIN, OF NEW YORK CITY.

*Letters Patent No. 75,386, dated March 10, 1868.*

---

IMPROVEMENT IN GRAIN-DRIERS.

---

The Schedule referred to in these Letters Patent and making part of the same.

---

TO ALL WHOM IT MAY CONCERN:

Be it known that I, JULIUS DE BARY, of Offenbach, in the Duchy of Hesse Darmstadt, Germany, have invented a new and improved Malt-Kiln and Grain-Drying Machine; and I do hereby declare that the following is a full, clear, and exact description thereof, which will enable others skilled in the art to make and use the same, reference being had to the accompanying drawings, and to the letters of reference marked thereon.

This invention relates to a new and improved kiln for drying malt and grain.

The invention has for its object the evaporating and carrying off of moisture contained in the malt or grain, by a very simple and compact means, which will operate very expeditiously and without injuring the malt or grain by undue or excessive heat.

To this end, the invention consists in carrying the malt or grain, by means of a series of endless conveyers, over a series of perforated plates placed one above the other, and impelling a current of hot air up through said perforated plates and conveyers, and through the malt or grain in transit, the hot air absorbing or taking up the moisture and carrying it off from the kiln. In the accompanying sheets of drawings—

Figure 1, Sheet No. 1, is a side view of my invention.

Figure 2, a vertical section of the same, taken in the line $x\,x$, fig. 3.

Figure 3, Sheet No. 2, a vertical section of the same, taken in the line $y\,y$, fig. 2.

Similar letters of reference indicate like parts.

A represents a casing, which is double walled. The inner wall $a$ may be of sheet metal, and a dead-air space allowed between the two walls or said space may be filled with any non-conducting material, to prevent the radiation of heat from the casing. This casing is placed directly over a foundation, B, into which a hot-air pipe, C, passes, or a flue, D, from a furnace. The flue D is of sinuous or zigzag form, in order to obtain as great a heat-radiating surface as possible, and the hot-air pipe C has an oblong slot, $a^\times$, made in one or both sides of it to admit of a broad stream of hot air being forced out from it to pass up through the casing. When the latter is heated by the pipe C, the hot air is forced through it by means of a fan, or other equivalent means; and when the flue D is used, the casing is heated simply by the radiation of heat therefrom. The latter is used when a gentle heat is required, and the former, when a greater heat is required in order to accomplish the work. Within the casing A there is placed a series of endless carriers, E, which may be constructed each of two endless chains $b$, with slats, $c$, fitted between them. The endless chains $b$ work around pulleys $d$ on shafts F in the casing, and the bearings of said shafts are made adjustable, in order that the carriers may be tightened in the event of the same becoming slack or loose by use. These carriers have a horizontal position in the casing, and they are placed one directly above the other, as shown more particularly in fig. 3, with a perforated plate or screen, G, placed underneath each; and under the upper part of the top carrier E there is placed a solid or unperforated metal plate, H, while perforated plates I are placed under the upper parts of the carriers underneath. The inner wall $a$, at its upper part, is perforated, as shown at $e$, and these perforations form a communication between the interior of the casing and tubes $I^\times$ at the outer side of the casing, (see figs. 2 and 3.) The endless carriers E all move in the direction indicated by the arrows in fig. 3, motion being communicated to the same through the medium of gearing $f$, shown in fig. 1. The casing is provided with doors $g$, placed one opposite or in line with each carrier, in order that the progress of the drying may be inspected from the bottom to the top of the casing, and thermometers placed therein to designate the temperature.

The malt or grain to be dried is deposited on the upper carrier E, and is conveyed along on the plate H by the plates $c$ of said carrier, and deposited upon the perforated plate G underneath, until it arrives at an opening, $h$, in G, through which it drops upon the perforated plate I of the carrier underneath, and is carried along on said plate I, and deposited upon the perforated plate G underneath; from whence it is dropped, through an opening, $h'$, upon the perforated plate I below, to be conveyed along by the carrier below, and so on until the malt or grain reaches the bottom of the casing, where it is discharged at $a^\times$.

The hot air, in passing up through the casing, carries off all the moisture through the tubes $I^\times$, and it will be seen that the malt or grain is subjected gradually to the heat, as the temperature of the casing or kiln increases gradually, of course, from its top downward, and the malt or grain also is made to pass over a large area within a small compass.

Having thus described my invention, I claim as new, and desire to secure by Letters Patent—

In a malt and grain-drying machine, the outer wooden case A, inner metallic case $a$, with an interposed air-space, the adjustable endless-chain scrapers E, perforated plates G I, imperforate plate H, pipes I$^\times$, and zigzag hot-air flue D, when constructed, arranged, and operating as described for the purpose specified.

The above specification of my invention signed by me, this      day of      , 1867.

JULIUS DE BARY.

Witnesses:
   JOS. KALTSCHMIDT,
   CARL RUPPERSBURG.